(12) United States Patent
Ye et al.

(10) Patent No.: US 12,038,635 B2
(45) Date of Patent: Jul. 16, 2024

(54) DISPLAY SCREEN SHELL AND DISPLAY SCREEN

(71) Applicants: TCL BUSINESS INFORMATION TECHNOLOGY (HUIZHOU) CO., LTD., Guangdong (CN); SHENZHEN HUASHENG SOFTWARE TECHNOLOGY CO., LTD., Guangdong (CN)

(72) Inventors: Xiongbo Ye, Guangdong (CN); Haiyan Li, Guangdong (CN)

(73) Assignees: TCL BUSINESS INFORMATION TECHNOLOGY (HUIZHOU) CO., LTD., Guangdong (CN); SHENZHEN HUASHENG SOFTWARE TECHNOLOGY CO., LTD., Guangdong (CN)

( * ) Notice: Subject to any disclaimer, the term of this patent is extended or adjusted under 35 U.S.C. 154(b) by 304 days.

(21) Appl. No.: 17/757,296

(22) PCT Filed: May 18, 2021

(86) PCT No.: PCT/CN2021/094460
§ 371 (c)(1),
(2) Date: Jun. 13, 2022

(87) PCT Pub. No.: WO2022/127020
PCT Pub. Date: Jun. 23, 2022

(65) Prior Publication Data
US 2023/0039947 A1 Feb. 9, 2023

(30) Foreign Application Priority Data
Dec. 15, 2020 (CN) .......................... 202011492364.8

(51) Int. Cl.
*G06F 1/16* (2006.01)
*G02F 1/1333* (2006.01)

(52) U.S. Cl.
CPC .. *G02F 1/133305* (2013.01); *G02F 1/133314* (2021.01); *G02F 1/133317* (2021.01); *G02F 1/133331* (2021.01); *G02F 1/13338* (2013.01)

(58) Field of Classification Search
CPC .... G06F 1/1601; G06F 1/1613; G06F 1/1637; G02F 1/133317; G02F 1/13338
See application file for complete search history.

(56) References Cited

U.S. PATENT DOCUMENTS

| 11,995,277 B2* | 5/2024 | Kim | ................... H01L 24/04 |
| 2022/0276734 A1* | 9/2022 | Fu | ................... G06F 3/0421 |
| 2022/0291767 A1* | 9/2022 | Deng | ................... G06F 3/0421 |

FOREIGN PATENT DOCUMENTS

| CN | 104575274 A | 4/2015 |
| CN | 109660640 A | 4/2019 |

(Continued)

OTHER PUBLICATIONS

International Search Report in International application No. PCT/CN2021/094460, mailed on Aug. 24, 2021.

(Continued)

*Primary Examiner* — Anthony Q Edwards
(74) *Attorney, Agent, or Firm* — PV IP PC; Wei Te Chung; Zhigang Ma

(57) ABSTRACT

The present disclosure provides a display screen shell and a display screen. A display panel is disposed on a first flexible pad by disposing the first flexible pad on a middle frame. A tempered glass is disposed on a second flexible pad by disposing the second flexible pad on the middle frame. Elastic force of the flexible pads makes the display panel and the tempered glass assemble together, so that there is no gap between the tempered glass and the display panel. The (Continued)

tempered glass and a liquid crystal display (LCD) screen are pressed together at an edge by pressing on the tempered glass of the pressing portion, making the tempered glass and the display panel attached together effectively for a long time, and no gap is created at an attaching place and extremely small parallax is achieved, making writing experience and visual experience optimal.

20 Claims, 3 Drawing Sheets

(56) References Cited

FOREIGN PATENT DOCUMENTS

| CN | 208705767 U | 4/2019 |
|---|---|---|
| CN | 210836037 U | 6/2020 |
| CN | 211479090 U | 9/2020 |
| CN | 211906844 U | 11/2020 |
| CN | 211979639 U | 11/2020 |
| CN | 212433536 U | 1/2021 |

OTHER PUBLICATIONS

Written Opinion of the International Search Authority in International application No. PCT/CN2021/094460, mailed on Aug. 24, 2021.

\* cited by examiner

DISPLAY SCREEN SHELL AND DISPLAY SCREEN

BACKGROUND OF DISCLOSURE

1. Field of Disclosure

The present disclosure relates to a technical field of display devices, and in particular, to a display screen shell and a display screen.

2. Description of Prior Art

At present, interactive education and conference panels mainly use infrared touch embodiment as a mainstream technical embodiment, and most of their structural forms adopt a frame mode. In a frame embodiment, there is a gap between a tempered glass and a display panel, so that there is a clear hollow feeling when writing on the display screen of the frame embodiment.

Due to an existence of the gap between the tempered glass and the display panel in the prior art, the gap causes visual difference during writing and displaying, resulting in a hollow feeling, and resulting in poor touch writing experience and poor visual experience.

Hence, the prior art is defective, and it is urgent to improve it.

BRIEF SUMMARY OF DISCLOSURE

In view of the above-mentioned deficiencies of the prior art, a purpose of the present application is to provide a display screen shell and a display screen. A technical problem solved by embodiment of this disclosure includes the existence of a gap between the tempered glass and the display panel in the prior art after the tempered glass and the display panel are assembled.

According to an embodiment of the present disclosure, a display screen shell is disclosed. The display screen shell, used to connect a display panel and a tempered glass, wherein the display screen shell includes: a middle frame; a first flexible pad, the first flexible pad disposed on the middle frame, and the display panel disposed on the first flexible pad; a second flexible pad, the second flexible pad disposed on the middle frame, and the tempered glass disposed on the second flexible pad and located at a light-emitting side of the display panel; and a pressing portion, the pressing portion disposed on a light-emitting surface of the tempered glass and in contact with the tempered glass.

Furthermore, the display screen shell further includes a backplate, the middle frame disposed on the backplate; the middle frame includes: a bottom plate, the bottom plate disposed on the backplate and extending along the light-emitting side of the display panel; a first supporting plate, the first supporting plate disposed on one side of the bottom plate facing away from the backplate, the first flexible pad disposed on the first supporting plate; a second supporting plate, the second supporting plate disposed on one side of the first supporting plate facing away from the backplate, the second flexible pad disposed on the second supporting plate.

Furthermore, the middle frame further includes: a fixing post, the fixing post connected to one side of the second supporting plate facing away from the backplate; the fixing post is provided with a limit block, the limit block is located between the fixing post and a lateral side of the tempered glass.

Furthermore, the display screen shell further includes: a profile frame, the profile frame connected to the backplate, located outside of the middle frame, the pressing portion disposed on the profile frame.

Furthermore, the profile frame includes: a frame, the frame disposed on the backplate and located at one side of the middle frame facing away from the display panel; a bending portion, the bending portion connected to the frame, the bending portion located at one side of the middle frame facing away from the backplate, the pressing portion connected to the bending portion.

Furthermore, the profile frame further includes a receiving cavity defined between the frame and the bending portion, an inner wall of the receiving cavity is provided with a groove; the pressing portion includes: a clipping bar, the clipping bar embedded in the groove; a compressing block, the compressing block connected to the clipping bar and protruding from the receiving cavity, the compressing block is in contact with the light-emitting surface of the tempered glass.

Furthermore, the receiving cavity includes an infrared emitting tube, an emitting end of the infrared emitting tube faces towards the pressing portion.

Furthermore, a folded edge is disposed at an edge of the backplate, a receiving groove is defined at a surface of the frame facing towards the backplate, the folded edge is located in the receiving groove.

Furthermore, the first flexible pad and the second flexible pad are both silicone rubber pads, a hardness of the first flexible pad is greater than a hardness of the second flexible pad; the pressing portion is a light filter bar.

According to an embodiment of the present disclosure, a display screen is disclosed. The display screen includes: the display screen shell as mentioned above; a display panel being disposed on the display screen shell; a tempered glass disposed on the display screen shell and in contact with the pressing portion, making the tempered glass attach to the display panel; and a backlight module, the backlight module disposed on the display screen shell and located at one side of the display panel facing away from the tempered glass.

According to an embodiment of the present disclosure, a display screen shell is disclosed. The display screen shell, used to connect a display panel and a tempered glass, includes: a middle frame and a pressing portion, wherein the middle frame is used to support the display panel, the pressing portion in contact with the tempered glass to make the tempered glass attach to the display panel.

Furthermore, the display screen shell further includes a backplate and the middle frame, the middle frame disposed on the backplate; the middle frame includes: a bottom plate fixed to the backplate; and a supporting plate, connected to the bottom plate, the supporting plate used to support the display panel.

Furthermore, the display screen shell further includes: a first flexible pad, the first flexible pad disposed between the middle frame and the display panel.

Furthermore, the display screen shell further includes: a second flexible pad, the first flexible pad and the second flexible pad disposed on the supporting plate.

Furthermore, the supporting plate includes a first supporting plate and a second supporting plate, the first flexible pad and the second flexible pad disposed on the first supporting plate and the second supporting plate respectively.

Furthermore, the middle frame further includes: a fixing post, the fixing post connected to one side of the second supporting plate facing away from the backplate; the fixing post is provided with a limit block, the limit block is located between the fixing post and a lateral side of the tempered glass.

Furthermore, the display screen shell further includes: a profile frame, the profile frame connected to the backplate, located outside of the middle frame, the pressing portion disposed on the profile frame.

Furthermore, the profile frame includes: a frame, the frame disposed on the backplate and located at one side of the middle frame facing away from the display panel; a bending portion, the bending portion connected to the frame, the bending portion located at one side of the middle frame facing away from the backplate, the pressing portion connected to the bending portion.

Furthermore, the profile frame further includes a receiving cavity defined between the frame and the bending portion, an inner wall of the receiving cavity is provided with a groove; the pressing portion includes: a clipping bar, the clipping bar embedded in the groove; a compressing block, the compressing block connected to the clipping bar and protruding from the receiving cavity, the compressing block is in contact with the light-emitting surface of the tempered glass.

Furthermore, the receiving cavity includes an infrared emitting tube, an emitting end of the infrared emitting tube faces towards the pressing portion; a folded edge is disposed at an edge of the backplate, a receiving groove is defined at a surface of the frame facing towards the backplate, the folded edge is located in the receiving groove; the first flexible pad and the second flexible pad are both silicone rubber pads, a hardness of the first flexible pad is greater than a hardness of the second flexible pad; the pressing portion is a light filter bar.

An embodiment of this disclosure achieves an advantageous effect that according to the display screen shell and the display screen provided by the embodiment of the present disclosure. The display panel is disposed on the first flexible pad by disposing the first flexible pad on the middle frame. The tempered glass is disposed on the second flexible pad by disposing the second flexible pad on the middle frame. The elastic force of the flexible pads makes the display panel and the tempered glass assembled together, so that there is no gap between the tempered glass and the display panel, and 0-distance-attaching between the tempered glass and the display panel is achieved. The tempered glass and the LCD screen are pressed together at the edge thereof by pressing on the tempered glass of the pressing portion, making the tempered glass and the display panel attached together effectively for a long time. There will be no gap at the attaching place and finally the extreme small parallax is achieved. And there will be no hollowing feeling in the effect of writing, making the writing experience and visual experience optimal.

BRIEF DESCRIPTION OF DRAWINGS

For more clearly understanding above content of the present disclosure, the following text will briefly introduce the accompanying drawings used in the preferred embodiment of the present invention. It is obvious that the accompanying drawings in the following description are only some embodiment of the present invention. For the technical personnel of the field, other drawings can also be obtained from these drawings without paying creative work.

Labels in the figures: 100 middle frame; 110 first flexible pad; 120 second flexible pad; 130 bottom plate; 140 first supporting plate; 141 first stepped portion; 150 second supporting plate; 151 second stepped portion; 160 fixing post; 161 limit block; 200 profile frame; 210 pressing portion; 211 clipping bar; 212 compressing block; 220 frame; 221 receiving groove; 230 bending portion; 240 receiving cavity; 241 groove; 300 display panel; 400 tempered glass; 500 backplate; 510 folded edge; 520 screw; 600 infrared circuit board; 610 infrared emitting tube; 700 backlight module.

DETAILED DESCRIPTION OF PREFERRED EMBODIMENTS

The present application provides a display screen shell and a display screen. In order to make the objectives, technical embodiment, and advantages of the present disclosure clearer, the present disclosure will be described in further detail below with reference to the accompanying drawings and embodiment. It should be understood that the specific embodiment described herein are only used to explain the present disclosure, but not to limit the present disclosure.

Figure 1:
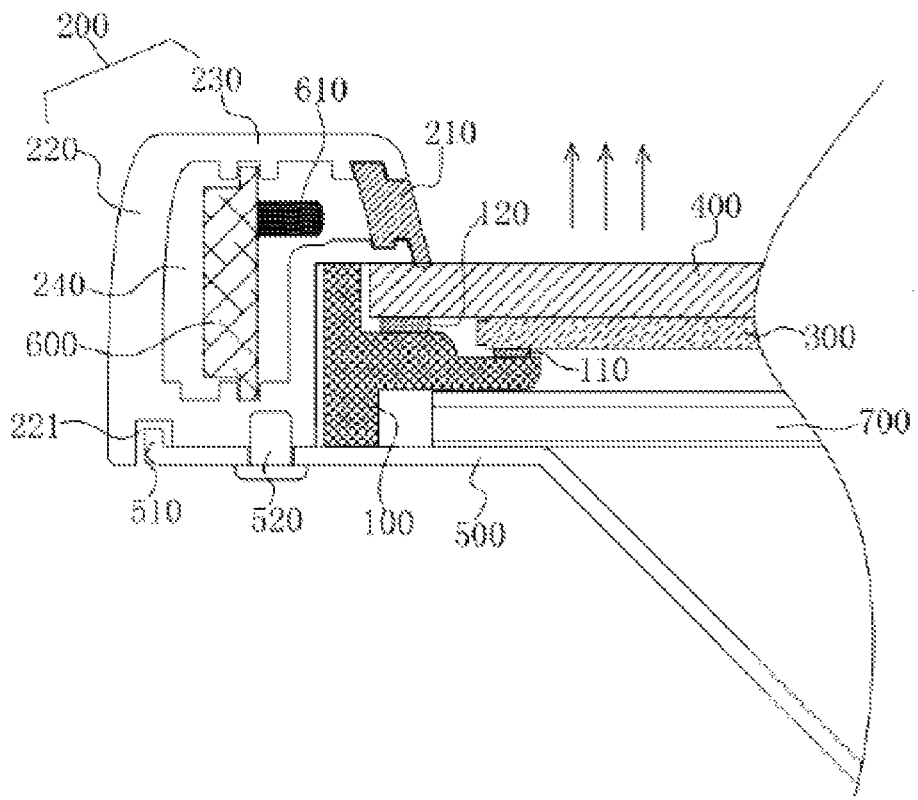
FIG. 1 is a cross-sectional view of a display screen in an embodiment of the present disclosure.
Figure 2:
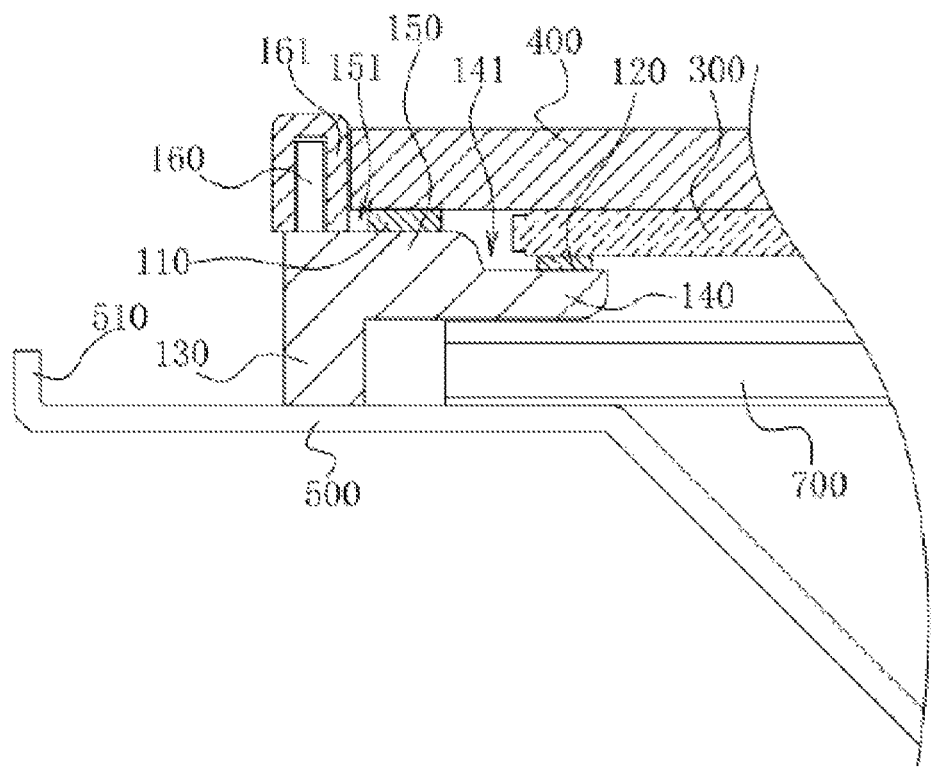
FIG. 2 is a cross-sectional view of a partial structure of a display screen shell in an embodiment of the present disclosure.
Figure 3:
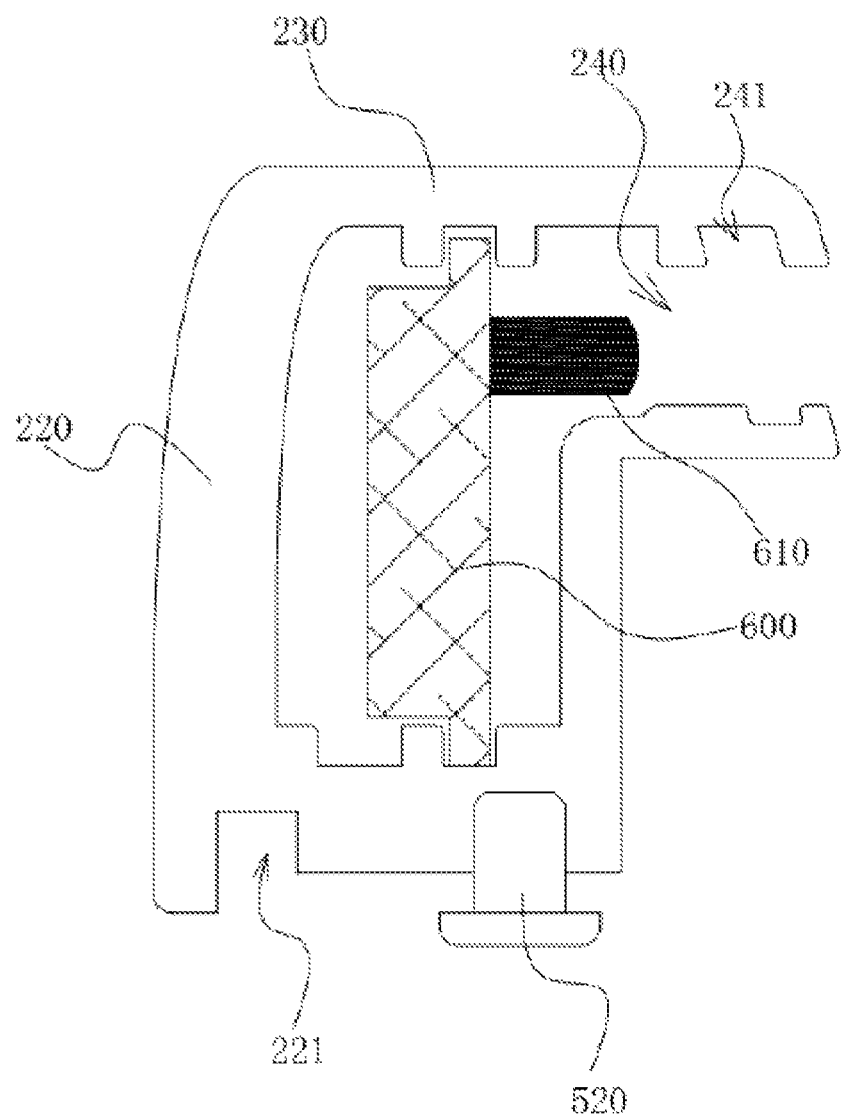
FIG. 3 is a cross-sectional view of an internal structure of a profile frame in an embodiment of a display screen shell of the present disclosure.
Figure 4:
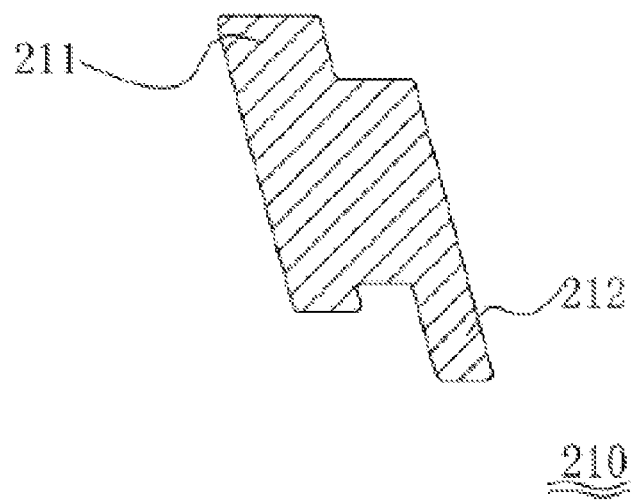
FIG. 4 is a cross-sectional view of a pressing portion of a display screen shell in an embodiment of the present disclosure.

As shown in FIG. 1 and FIG. 2, the embodiment of the present disclosure provides a display screen shell, which is used to connect a display panel 300 and a tempered glass 400. The display screen shell includes: a middle frame 100; a first flexible pad 110, a second flexible pad 120, and a pressing portion 210. For the convenience of structural description, the direction toward a center of the display panel 300 is an inner side, and a direction away from the center of the display panel 300 is an outer side. One side of the display panel 300 that emits light (in a direction of an arrow in FIG. 1) is a light-emitting side, and when the display screen is used again, a user is located on the light-emitting side of the display panel 300. The first flexible pad 110 is disposed on the middle frame 100, and the display panel 300 is disposed on the first flexible pad 110. The second flexible pad 120 is disposed on the middle frame 100, and the tempered glass 400 is disposed on the second flexible pad 120. The tempered glass 400 is disposed on the light-emitting side of the display panel 300. The pressing portion 210 is disposed on a light-emitting surface of the tempered glass 400 and is in contact with the tempered glass 400. That is, the pressing portion 210 is pressed on the tempered glass 400, thereby compressing the tempered glass 400 to the display panel 300, and there will be no gap on the attaching surface.

In this embodiment, by disposing the first flexible pad 110 on the middle frame 100, the display panel 300 is disposed on the first flexible pad 110, and by disposing the second flexible pad 120 on the middle frame 100, the tempered glass 400 is disposed on the second flexible pad 120. The elastic force generated by the flexible pads makes the display panel 300 and the tempered glass 400 fit together and assembled together by force, so that there is no gap between the tempered glass 400 and the display panel 300, and 0-distance-attaching is achieved. The tempered glass 400 is pressed by the pressing portion 210, so that the tempered glass 400 and a liquid crystal screen are pressed together at the edge, so that the tempered glass 400 and the display panel 300 are attached together effectively for a long time, so that there is no gap at the attaching place, and finally achieve extremely small parallax, so that there is no hollowing feeling during writing, so that a writing experience and visual experience are optimal.

In a specific structure of this embodiment, the display screen shell further includes a backplate 500. The backplate 500 is located on one side of the display panel 300 facing away from the light-emitting side of the display panel 300, and the middle frame 100 is disposed on the backplate 500. The middle frame 100 specifically includes: a bottom plate 130, a first supporting plate 140, and a second supporting plate 150. The bottom plate 130 is disposed on the backplate 500 and extends along the light-emitting side of the display panel 300. The first supporting plate 140 is disposed on one side of the bottom plate 130 facing away from the backplate 500. The first flexible pad 110 is bonded on the first supporting plate 140. The second supporting plate 150 is disposed on one side of the first supporting plate 140 facing away from the backplate 500, and the second flexible pad 120 is bonded on the second supporting plate 150. The first supporting plate 140 supports the display panel 300 through the first flexible pad 110, and the second supporting plate 150 supports the tempered glass 400 through the second flexible pad 120, thus forming a stable support for the display panel 300 and the tempered glass 400. The first flexible pad 110 and the second flexible pad 120 are both silicone rubber pads, and a hardness of the first flexible pad 110 is greater than a hardness of the second flexible pad 120. In this way, when the tempered glass 400 is pressed by the pressing portion 210, an amount of compression of the first flexible pad 110 is small, and an amount of compression of the second flexible pad 120 is larger, so that the tempered glass 400 can be more easily attached to the display panel 300, and 0-gap state is formed. Specifically, it can be set as follows: using Shore Hardness Standard, the hardness of the first flexible pad 110 is 60 degrees, and the hardness of the second flexible pad 120 is 30 degrees. In addition, a thickness of the first flexible pad 110 along the light-emitting direction is greater than a thickness of the second flexible pad 120 along the light-emitting direction, so that when the tempered glass 400 is pressed down, the downward movement of the tempered glass 400 is large, while the downward movement of the display panel 300 is small. So that the tempered glass 400 and the display panel 300 are attached more closely.

An inner side surface of the first supporting plate 140 protrudes from an inner side surface of the second supporting plate 150, so that there is a first stepped portion 141 between the inner side surface of the second supporting plate 150 and a surface of the first supporting plate 140 facing towards the display panel 300. The first stepped portion 141 is located outside of an edge of the display panel 300, and the first step 141 limits a position of the display panel 300, thereby facilitating installation of the display panel 300.

The middle frame 100 further includes a fixing post 160, and the fixing post 160 is connected to one side of the second supporting plate 150 facing away from the backplate 500, and the fixing post 160 is located outside of the second flexible pad 120. The fixing post 160 extends along the light-emitting direction, and a second stepped portion 151 is formed between the fixing post 160 and the second supporting plate 150. The tempered glass 400 is limited by the second stepped portion 151 to facilitate installation of the tempered glass 400. A limit block 161 is disposed on the fixing post 160, and the limit block 161 is located between the fixing post 160 and a lateral side of the tempered glass 400. Usually, a black silk screen area is set on an edge of the tempered glass 400, and the limit block 161 can be used to accurately limit a position, so that the black silk screen area of the tempered glass 400 will not be displaced in the module, so that the assembly accuracy of the tempered glass 400 can be guaranteed as an external part. Specifically, the limit block 161 is a U-shaped limit block, and the U-shaped limit block is sleeved on the fixing post 160, so that the U-shaped limit block covers an inner side and an outer side of the fixing post 160. After the U-shaped limit block and the fixing post 160 are assembled, the tempered glass 400 can be precisely positioned to achieve direct stacking assembly on the assembly line. There is no need to use the split assembly form of tempered glass+liquid crystal display (LCD) screen+aluminum frame, which improves assembly accuracy and production efficiency.

The display screen shell also includes a profile frame 200, the profile frame 200 is detachably connected to the backplate 500 through screw 520. The profile frame 200 is located outside of the middle frame 100, and the pressing portion 210 is disposed on the profile frame 200. The expressing portion 210 is supported by the profile frame 200. When the profile frame 200 is connected to the backplate 500, the pressing portion 210 is compressed to the tempered glass 400. A side of the pressing portion 210 facing towards the light-emitting side of the tempered glass 400 has a certain amount of interference fit with the tempered glass 400, so that a pressing force is generated through the interference fit, thereby compressing the tempered glass 400. The screw 520 can adjust an overall fitting-gap effectively, tightening the screw 520 enables the profile frame 200 to drive the pressing portion 210 to press the tempered glass 400 and the display panel 300 to achieve a 0-gap state.

The profile frame 200 specifically includes: a frame 220 and a bending portion 230. The frame body 220 is disposed on the backplate 500, and the frame 220 is located on the side of the middle frame 100 facing away from the display panel 300, that is, outside of the middle frame 100. The bending portion 230 is connected to the frame 220. The bending portion 230 is located on the side of the middle frame 100 facing away from the backplate 500, and the pressing portion 210 is connected to the bending portion 210. The profile frame 200 wraps the middle frame 100 through the frame 220 and the bending portion 230, so that the profile frame 200 can achieve a stable fixation as an external part.

The profile frame 200 further includes a receiving cavity 240 defined between the frame 220 and the bending portion 230, and a groove 241 is formed on an inner wall of a partial portion of the receiving cavity 240 of the bending portion 230. An opening is formed on an inner side of the bending portion 230, and the opening is connected with the receiving cavity 240. The groove 241 is located at the opening and the pressing portion 210 is inserted in the opening. The structure of the pressing portion 210 specifically includes: a clipping bar 211 and a compressing block 212. The clipping bar 211 is inserted into the groove 241, the pressing portion 210 is fixed by the clipping bar 211, and the compressing block 212 is connected to the clipping bar 211 and protrudes from the receiving cavity 240. The compressing block 212 abuts on the light-emitting surface of the tempered glass 400 after passing through the opening. An inner side of the compressing block 212 is inclined inwardly along an opposite direction of light-emitting direction, so that the edge of the display screen forms an inclined angle, which improves the appearance experience.

In order to realize an infrared touch writing function, an infrared circuit board 600 is disposed in the receiving cavity 240, an infrared emitting tube 610 is disposed on the infrared circuit board 600, the infrared emitting tube 610 is disposed in the receiving cavity 240, and an emitting end of the infrared emitting tube 610 faces towards the pressing portion 210. In this way, the infrared emitting tube 610 emits infrared rays, and the infrared rays pass through the pressing portion 210, so that the infrared rays can be located on the light-emitting side of the tempered glass 400. When writing on the tempered glass 400, the infrared rays can be sensed to realize the writing function. The pressing portion 210 is a light filter bar, which can filter out stray light entering an infrared sensor, so that sensing is more accurate and sensitive.

The edge of the backplate 500 is provided with a folded edge 510. A receiving groove 221 is defined on a surface of the frame 220 facing towards the backplate 500, and the folded edge 510 is located in the receiving groove 221. In this way, the edge of the backplate 500 is clamped and embedded in the profile frame 200, the backplate 500 is edge-sealed, and the edge of the backplate 500 can be prevented from being exposed, so that the structure is stable and more beautiful.

Based on a same concept, the present disclosure also proposes a display screen, the display screen includes: the display screen shell as described above, a display panel 300 disposed on the display screen shell, a tempered glass 400 disposed on the display screen shell, and a backlight module 700. The backlight module 700 provides backlight for the display panel 300 to realize a display function. The backlight module 700 is disposed on the display screen shell, and is located on the side of the display panel 300 facing away from the tempered glass 400. Specifically, an installation space is provided between the first supporting plate 140 in the middle frame 100 and the backplate 500 and the backlight module 700 is inserted into the installation space for fixing. An inner side of the bottom plate 130 limits an edge of the backlight module 700, so as to facilitate the installation of the backlight module 700.

In a summary, the present application proposes a display screen shell and a display screen. By disposing the first flexible pad 110 on the middle frame 100, the display panel 300 is disposed on the first flexible pad 110, through disposing the second flexible pad 110 on the middle frame 100, the tempered glass 400 is disposed on the second flexible pad 120, and the display panel 300 is assembled with the tempered glass 400 by the elastic force generated by the flexible pads. There will be no gap between the tempered glass 400 and the display panel 300, achieving a 0-distance attaching. The tempered glass 400 is squeezed by the pressing portion 210, so that the tempered glass 400 and the liquid crystal screen are pressed together at the edge, so that the tempered glass 400 and the display panel 300 are attached together effectively for a long time, and no gap is generated at the attaching place, and finally achieve extremely small parallax, so that there is no hollowing feeling during writing, so that the writing experience and visual experience are optimal.

In addition, compared with the prior art, this embodiment does not require the front iron frame of the existing module, thereby reducing the cost of bill of material parts, making assembly simpler and improving assembly efficiency.

Figure 5:
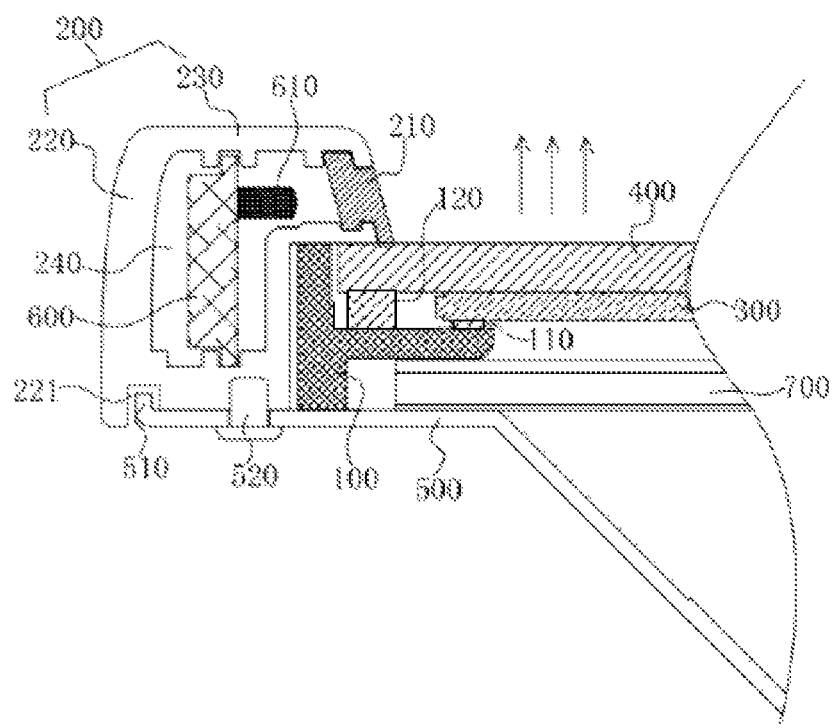
FIG. 5 is a cross-sectional view of the display screen in another embodiment of the present disclosure.

As shown in FIG. 5, this embodiment proposes another display screen shell for connecting the display panel 300 and the tempered glass 400, wherein, the display screen shell includes: a middle frame 100 and a pressing portion 210.

Wherein the middle frame 100 is used to support the display panel 300, and the pressing portion 210 abuts the tempered glass 400, so that the tempered glass 400 is attached to the display panel 300. It should be noted that the tempered glass 400 may be attached to the display panel 300 partially or completely, which depends on magnitude of the force exerted by the pressing portion 210 on the tempered glass 400.

The display screen shell further includes a backplane 500 and a middle frame 100, the middle frame 100 is disposed on the backplane 500. The middle frame 100 includes: a bottom plate 130 and a supporting plate. The bottom plate 130 is fixed on the backplane 500, and the supporting plate is connected to the bottom plate 130. The supporting plate is used for supporting the display panel 300.

In this embodiment, the display screen shell includes a first flexible pad 110 located between the middle frame 100 and the display panel 300.

In another embodiment, the display screen shell includes a first flexible pad 100 and a second flexible pad 120, both the first flexible pad 100 and the second flexible pad 120 are located on the supporting plate.

During attaching process of the display panel 300 and the tempered glass 400, the first flexible pad 110 and the second flexible pad 120 are both used to protect the display panel 300, so as to avoid damage to the display panel 300 due to lack of buffer force during mechanical contact between the display panel 300 and the tempered glass 400.

The supporting plates includes a first supporting plate 140 and a second supporting plate 150, and the first flexible pad 110 and the second flexible pad 120 are respectively disposed on the first supporting plate 140 and the second supporting plate 150. Compared with the above-mentioned embodiment, heights of the first supporting plate 140 and the second supporting plate 150 in this embodiment are same. Of course, in other embodiment, heights of the first supporting plate 140 and the second supporting plate 150 can be adjusted freely according to actual needs.

Except for the above-mentioned structure, which is different from that of the display screen shell described in the above embodiment, other structures are same as those of the display screen shell described in the above embodiment, and will not be repeated here.

The above descriptions are only a preferred embodiment of the present disclosure, and are not intended to limit the present disclosure. Any modifications, equivalent replacements, improvements, etc. made within the spirit and principles of the present disclosure shall be included in the protection range of the present disclosure.

What is claimed is:

1. A display screen shell, used to connect a display panel and a tempered glass, wherein the display screen shell comprises:
   a middle frame;
   a first flexible pad, the first flexible pad disposed on the middle frame, and the display panel disposed on the first flexible pad;
   a second flexible pad, the second flexible pad disposed on the middle frame, and the tempered glass disposed on the second flexible pad and located at a light-emitting side of the display panel; and a pressing portion, the pressing portion disposed on a light-emitting surface of the tempered glass and in contact with the tempered glass.

2. The display screen shell as claimed in claim 1, wherein the display screen shell further comprises a backplate, the middle frame disposed on the backplate;
the middle frame comprises:
a bottom plate, the bottom plate disposed on the backplate and extending along the light-emitting side of the display panel;
a first supporting plate, the first supporting plate disposed on one side of the bottom plate facing away from the backplate, the first flexible pad disposed on the first supporting plate;
a second supporting plate, the second supporting plate disposed on one side of the first supporting plate facing away from the backplate, the second flexible pad disposed on the second supporting plate.

3. The display screen shell as claimed in claim 2, wherein the middle frame further comprises:
a fixing post, the fixing post connected to one side of the second supporting plate facing away from the backplate;
the fixing post is provided with a limit block, the limit block is located between the fixing post and a lateral side of the tempered glass.

4. The display screen shell as claimed in claim 2, wherein the display screen shell further comprises:
a profile frame, the profile frame connected to the backplate, located outside of the middle frame, the pressing portion disposed on the profile frame.

5. The display screen shell as claimed in claim 4, wherein the profile frame comprises:
a frame, the frame disposed on the backplate and located at one side of the middle frame facing away from the display panel;
a bending portion, the bending portion connected to the frame, the bending portion located at one side of the middle frame facing away from the backplate, the pressing portion connected to the bending portion.

6. The display screen shell as claimed in claim 5, wherein the profile frame further comprises a receiving cavity defined between the frame and the bending portion, an inner wall of the receiving cavity is provided with a groove;
the pressing portion comprises:
a clipping bar, the clipping bar embedded in the groove;
a compressing block, the compressing block connected to the clipping bar and protruding from the receiving cavity, the compressing block is in contact with the light-emitting surface of the tempered glass.

7. The display screen shell as claimed in claim 6, wherein the receiving cavity comprises an infrared emitting tube, an emitting end of the infrared emitting tube faces towards the pressing portion.

8. The display screen shell as claimed in claim 5, wherein a folded edge is disposed at an edge of the backplate, a receiving groove is defined at a surface of the frame facing towards the backplate, the folded edge is located in the receiving groove.

9. The display screen shell as claimed in claim 1, wherein the first flexible pad and the second flexible pad are both silicone rubber pads, a hardness of the first flexible pad is greater than a hardness of the second flexible pad; the pressing portion is a light filter bar.

10. A display screen, comprising: the display screen shell as claimed in claim 1;
a display panel being disposed on the display screen shell;
a tempered glass disposed on the display screen shell and in contact with the pressing portion, making the tempered glass attach to the display panel; and
a backlight module, the backlight module disposed on the display screen shell and located at one side of the display panel facing away from the tempered glass.

11. A display screen shell, used to connect a display panel and a tempered glass, wherein the display screen shell comprises: a middle frame and a pressing portion, wherein the middle frame is used to support the display panel, the pressing portion in contact with the tempered glass to make the tempered glass attach to the display panel.

12. The display screen shell as claimed in claim 11, wherein the display screen shell further comprises a backplate and the middle frame, the middle frame disposed on the backplate;
the middle frame comprises:
a bottom plate fixed to the backplate; and
a supporting plate, connected to the bottom plate, the supporting plate used to support the display panel.

13. The display screen shell as claimed in claim 12, wherein further comprising: a first flexible pad, the first flexible pad disposed between the middle frame and the display panel.

14. The display screen shell as claimed in claim 13, wherein further comprising: a second flexible pad, the first flexible pad and the second flexible pad disposed on the supporting plate.

15. The display screen shell as claimed in claim 14, the supporting plate comprises a first supporting plate and a second supporting plate, the first flexible pad and the second flexible pad disposed on the first supporting plate and the second supporting plate respectively.

16. The display screen shell as claimed in claim 15, wherein the middle frame further comprises:
a fixing post, the fixing post connected to one side of the second supporting plate facing away from the backplate;
the fixing post is provided with a limit block, the limit block is located between the fixing post and a lateral side of the tempered glass.

17. The display screen shell as claimed in claim 15, wherein the display screen shell further comprises:
a profile frame, the profile frame connected to the backplate, located outside of the middle frame, the pressing portion disposed on the profile frame.

18. The display screen shell as claimed in claim 17, wherein the profile frame comprises:
a frame, the frame disposed on the backplate and located at one side of the middle frame facing away from the display panel;
a bending portion, the bending portion connected to the frame, the bending portion located at one side of the middle frame facing away from the backplate, the pressing portion connected to the bending portion.

19. The display screen shell as claimed in claim 18, wherein the profile frame further comprises a receiving cavity defined between the frame and the bending portion, an inner wall of the receiving cavity is provided with a groove;
the pressing portion comprises:
a clipping bar, the clipping bar embedded in the groove;
a compressing block, the compressing block connected to the clipping bar and protruding from the receiving cavity, the compressing block is in contact with the light-emitting surface of the tempered glass.

20. The display screen shell as claimed in claim 19, wherein the receiving cavity comprises an infrared emitting tube, an emitting end of the infrared emitting tube faces towards the pressing portion;
- a folded edge is disposed at an edge of the backplate, a receiving groove is defined at a surface of the frame facing towards the backplate, the folded edge is located in the receiving groove;
- the first flexible pad and the second flexible pad are both silicone rubber pads, a hardness of the first flexible pad is greater than a hardness of the second flexible pad; the pressing portion is a light filter bar.

* * * * *